US012657118B2

(12) United States Patent
Rozovski et al.

(10) Patent No.: US 12,657,118 B2
(45) Date of Patent: Jun. 16, 2026

(54) AUTOMATED GENERATION OF JAVA UNIT TESTS

(71) Applicant: Wells Fargo Bank, N.A., San Francisco, CA (US)

(72) Inventors: Peter Rozovski, Concord, CA (US); Daniel Goldvekht, Millbrae, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 212 days.

(21) Appl. No.: 18/497,749

(22) Filed: Oct. 30, 2023

(65) Prior Publication Data
US 2025/0138990 A1     May 1, 2025

(51) Int. Cl.
*G06F 11/3668*          (2025.01)

(52) U.S. Cl.
CPC ...... *G06F 11/3696* (2013.01); *G06F 11/3684* (2013.01)

(58) Field of Classification Search
CPC ............................................. G06F 11/36–3698
See application file for complete search history.

(56) References Cited

U.S. PATENT DOCUMENTS

| | | | |
|---|---|---|---|
| 7,596,778 B2 | 9/2009 | Kolawa | |
| 9,983,983 B2 * | 5/2018 | Abadi ................. | G06F 11/3684 |
| 10,176,087 B1 * | 1/2019 | Thomas .............. | G06F 11/3684 |

| | | | |
|---|---|---|---|
| 10,303,466 B1 * | 5/2019 | Karman .................... | G06F 8/73 |
| 11,768,759 B2 * | 9/2023 | Tiwari ....................... | G06F 8/31 |
| | | | 717/124 |
| 2008/0098361 A1 * | 4/2008 | Kumar ................ | G06F 11/3684 |
| | | | 717/128 |

(Continued)

FOREIGN PATENT DOCUMENTS

| | | |
|---|---|---|
| CN | 103106138 | 3/2016 |
| CN | 108710569 | 10/2018 |

(Continued)

OTHER PUBLICATIONS

"Diffblue Cover Key Features", [Online]. Retrieved from the Internet: URL: https: www.diffblue.com cover-key-features, (Accessed on Nov. 10, 2023), 8 pgs.

(Continued)

*Primary Examiner* — Todd Aguilera
(74) *Attorney, Agent, or Firm* — SCHWEGMAN LUNDBERG & WOESSNER, P.A.

(57) ABSTRACT

Systems and techniques for automated generation of Java unit tests, in the context of testing a code base for a financial transaction software application, are described. An example method for automated generation of Java unit tests includes: identifying default values used in Java source code of a financial transaction software application that is programmed and capable to perform batch processing of a plurality of financial transactions; identifying classes in the Java source code that are invoked by the financial transaction software application, as invoked during the batch processing; generating mock classes for the identified classes that are invoked; creating unit tests to perform unit testing of the identified classes that are invoked, the unit tests configured to invoke the mock classes and use the default values for unit testing of the identified classes; and outputting the unit tests (and optionally, executing the unit tests).

17 Claims, 6 Drawing Sheets

(56)                     References Cited

U.S. PATENT DOCUMENTS

| | | | |
|---|---|---|---|
| 2018/0032425 A1* | 2/2018 | Abadi | G06F 11/3696 |
| 2018/0300186 A1* | 10/2018 | Grantham | G06F 16/258 |
| 2019/0138432 A1 | 5/2019 | Nagaraj et al. | |
| 2022/0100644 A1* | 3/2022 | Tiwari | G06F 8/74 |

FOREIGN PATENT DOCUMENTS

| | | |
|---|---|---|
| CN | 113157586 | 7/2021 |
| CN | 114860589 | 8/2022 |
| CN | 115190057 | 10/2022 |
| CN | 115981989 | 4/2023 |
| WO | 2018227735 | 12/2018 |
| WO | 2023096152 | 6/2023 |

OTHER PUBLICATIONS

"Java Unit Test Generator for IntelliJ IDEA", [Online]. Retrieved from the Internet: URL: https: squaretest.com , (Accessed on Nov. 13, 2023), 8 pgs.

Codium AI Team, "Best Practices in Automatic Java Unit Test Generation", [Online]. Retrieved from the Internet: URL: https: www.codium.ai blog automatic-java-unit-test-generation-best-practices , (May 24, 2023), 7 pgs.

Conroy, Kevin M, "Automatic Test Generation From GUI-Based Applications For Testing Web Services", 2007 IEEE International Conference on Software Maintenance, (2007), 10 pgs.

Sharma, Asankhaya, "Automated Unit Test Generation for Java", [Online]. Retrieved from the Internet: URL: https: www.veracode. com blog research automated-unit-test-generation-java, (Jan. 4, 2015), 7 pgs.

Waugh, Lisa, "Using TackleTest-Unit to automatically create Java unit tests", [Online]. Retrieved from the Internet: URL: https: research.ibm.com blog tackletest-unit-auto-java-tests, (Nov. 7, 2022), 8 pgs.

Zhang, Benwen, "Assisting Developers in the Creation and Maintenance of Unit Tests", A dissertation submitted to the Faculty of the University of Delaware in partial fullfilment of the requirements for the degree of Doctor of Philosophy in ComputerScience, (2018), 24 pgs.

* cited by examiner

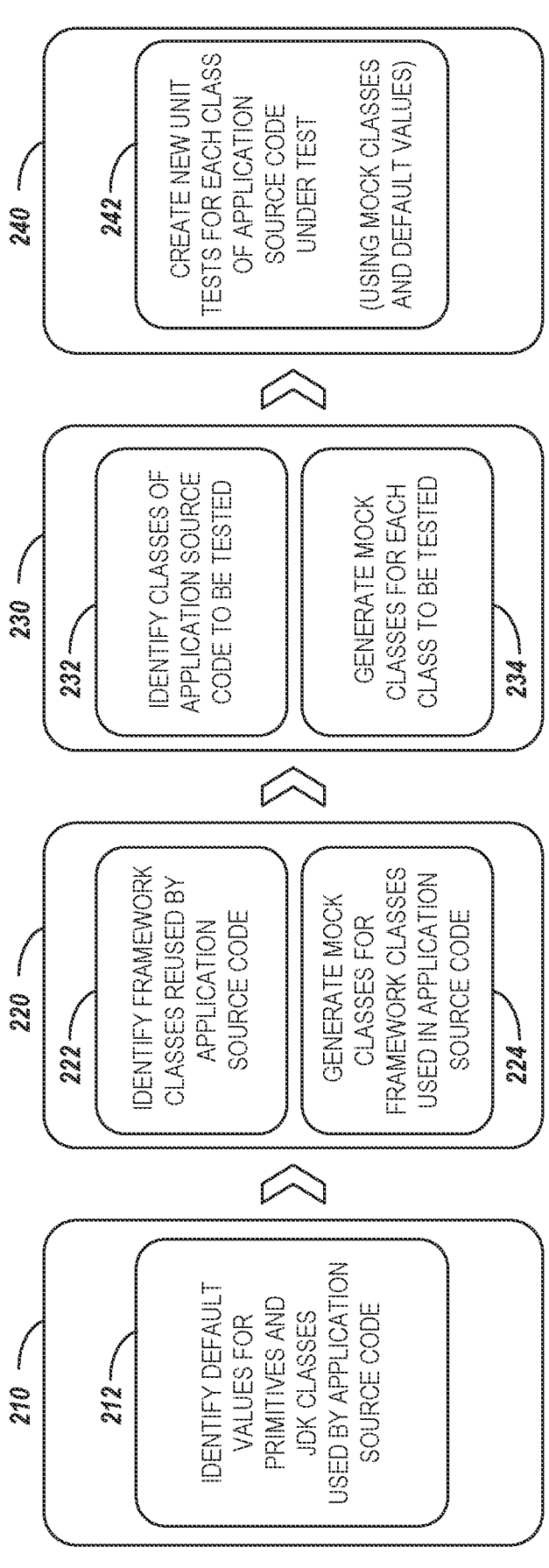

210

212 IDENTIFY DEFAULT VALUES FOR PRIMITIVES AND JDK CLASSES USED BY APPLICATION SOURCE CODE

220

222 IDENTIFY FRAMEWORK CLASSES REUSED BY APPLICATION SOURCE CODE

224 GENERATE MOCK CLASSES FOR FRAMEWORK CLASSES USED IN APPLICATION SOURCE CODE

230

232 IDENTIFY CLASSES OF APPLICATION SOURCE CODE TO BE TESTED

234 GENERATE MOCK CLASSES FOR EACH CLASS TO BE TESTED

240

242 CREATE NEW UNIT TESTS FOR EACH CLASS OF APPLICATION SOURCE CODE UNDER TEST (USING MOCK CLASSES AND DEFAULT VALUES)

FIG. 2

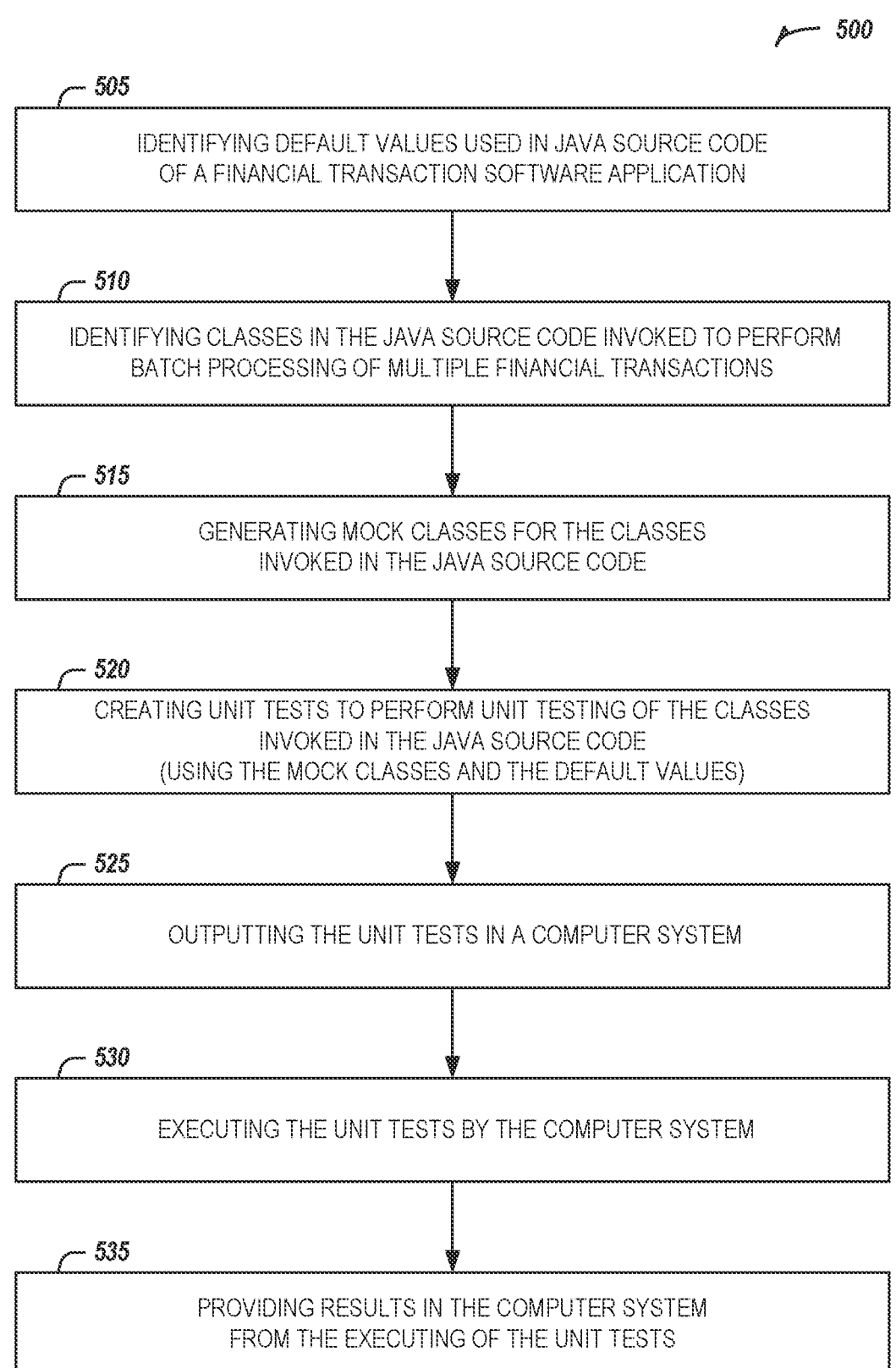

*500*

*505*

IDENTIFYING DEFAULT VALUES USED IN JAVA SOURCE CODE
OF A FINANCIAL TRANSACTION SOFTWARE APPLICATION

*510*

IDENTIFYING CLASSES IN THE JAVA SOURCE CODE INVOKED TO PERFORM
BATCH PROCESSING OF MULTIPLE FINANCIAL TRANSACTIONS

*515*

GENERATING MOCK CLASSES FOR THE CLASSES
INVOKED IN THE JAVA SOURCE CODE

*520*

CREATING UNIT TESTS TO PERFORM UNIT TESTING OF THE CLASSES
INVOKED IN THE JAVA SOURCE CODE
(USING THE MOCK CLASSES AND THE DEFAULT VALUES)

*525*

OUTPUTTING THE UNIT TESTS IN A COMPUTER SYSTEM

*530*

EXECUTING THE UNIT TESTS BY THE COMPUTER SYSTEM

*535*

PROVIDING RESULTS IN THE COMPUTER SYSTEM
FROM THE EXECUTING OF THE UNIT TESTS

*FIG. 5*

AUTOMATED GENERATION OF JAVA UNIT TESTS

TECHNICAL FIELD

Embodiments described herein generally relate to development and testing of source code and, in some embodiments, more specifically to the automatic generation of unit tests for JAVA source code, such as source code deployed in connection with payment processing operations.

BACKGROUND

Software testing is an important part of the development and deployment of software applications. One type of testing, unit testing, is intended to use each component or "unit" of source code to determine whether the software works as expected. Unit tests may be used throughout multiple portions of the software development process to catch bugs, and thus unit tests may be run when source code is first written, during code review and integration phases, and during maintenance and updating of the source code.

Techniques for developing unit tests can be generally classified in one of two categories. First, many organizations develop unit tests by manually writing code for unit tests. This is extremely time-consuming and the use of manually written code may introduce its own errors or incomplete coverage. Second, some software tools have been introduced that automatically generate unit tests. However, these software tools are generally very limited in their capabilities, and typically do not achieve complete coverage of a large code base.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates a workflow for creating unit tests, according to an example.

FIG. 5 is a flowchart of a method of automated generation of JAVA unit tests for a financial transaction software application, according to an example.

DETAILED DESCRIPTION

Figure 1:
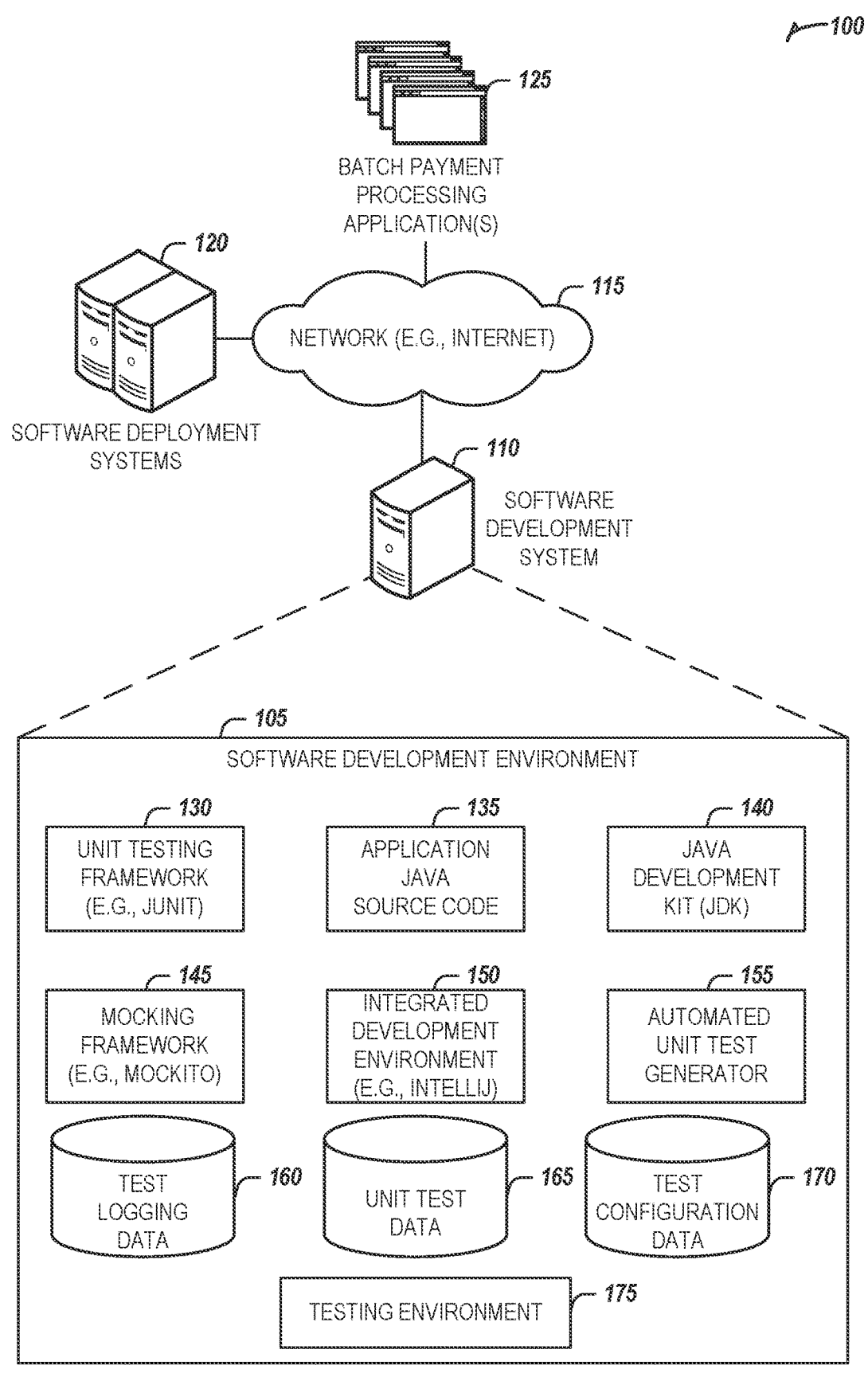
FIG. 1 is a block diagram of an environment and a system for automated generation of JAVA unit tests, according to an example.

The systems and techniques discussed herein enable an automated generation of JAVA unit tests and testing schemes for various software environments. Among other examples, this includes software environments that include payment batch processing use cases. The following systems and techniques can enable the generation of tens or hundreds of thousands of unit tests automatically, to obtain test coverage of large code sets in a much smaller time frame than with manual generation.

The following specifically details approaches that automatically generate unit tests for a payments batch processing software application written in JAVA, and various actions that can be taken to implement and enhance the coverage of such automated unit tests. These approaches provide a significantly improved code coverage as compared with existing JAVA unit test and software development practices. These approaches include determining default values for primitives and JAVA Development Kit (JDK) classes that are relevant to payments batch processing, so that unit tests and mock classes can be initialized and invoked with relevant operational values.

As will be understood, the following addresses a variety of technical problems and constraints relating to software development and testing. The problems caused by inadequate unit test coverage includes high and very ineffective usage of development resources, delays in the software development life cycle, and inability to support fast agile code development releases and fixes. The approaches discussed herein provide an improvement to these and other technical problems caused by inadequate code quality, and the tradeoffs and inaccuracy resulting from manually writing unit test scripts.

Unit Testing is part of standard "shift-left" (TDD, "Test-Driven Development") acceleration of a software development lifecycle process. Unit Testing is very important to identify bugs and code problems during development, to support short agile releases (e.g., 2 weeks) of new and updated code. In contrast, previous releases of software (such as under a rational unified process (RUP) software development process) may take months to fully develop, test, stage, and deploy software.

In the context of financial data processing, unit testing offers an important improvement for code written to perform batch processing. Batch processing generally refers to the grouping of many financial transactions together, so that a set of multiple transactions (each set of multiple transactions referred to as a "batch") can be processed together. Although batch processing may have frequent and consistent types of data inputs and operations, it may require many lines of code to accomplish a particular financial transaction operation. As a result, there are many challenges and technical problems introduced when developing and testing new and updated code of batch processing, including high time and resource costs and constraints for the large code base invoked. The approaches discussed herein to improve unit testing can help ensure that code used for batch processing, including legacy code, can be more adequately tested and exposed to unit testing operations.

FIG. 1 is a block diagram of an example of an environment 100 and a software development system 110 hosting a software development environment 105, according to an example. The software development environment 105 is implemented as software executed by a computing system (e.g., a standalone computing device, a server computing device, a cloud computing platform, a software-as-a-service (SaaS) platform, a virtual computing platform, etc.).

The software development system 110 may be communicatively coupled to software deployment system(s) 120 (e.g., server(s), cloud platform, etc.) and batch payment processing software application(s) 125 (e.g., user desktop applications, web-based applications, etc.) via a network 115 (e.g., a local area network, a wide area network, a wireless network, a cellular network, a satellite communications network, etc.). Additional networks, software applications, and communications used as part of software development and batch payment processing are not depicted for purposes of simplicity. In some examples, various components of FIG. 1 may be provided on separate systems or devices, or may communicate with each other via inter-process communication and other local communications techniques (e.g., shared memory, pipes, buffers, queues). Thus, the components of FIG. 1 may be parts of the same or different services or systems, and may communicate with each other (e.g., through a computer network) using various computer networking or communication protocols.

In an example, the software development environment 105 may offer specific approaches for the development and testing of JAVA source code used to build the applications 125. The software development environment 105 may include a number of functional components for these operations including a unit testing framework 130 (such as JUnit), an application JAVA source code repository 135, a development library such as the JAVA Development Kit (JDK) 140, a mocking framework 145 (such as Mockito), a source code integrated development environment 150 such as IntelliJ, and an automated unit test generator 155.

The techniques discussed herein may utilize the automated unit test generator 155 to generate unit tests for the application source code, shown as stored unit test data 165. These unit tests may be generated with the use of the mocking framework 145 and unit testing framework 130. The unit tests may be generated or operated with use of specific test configuration data 170, such as specific values for primitives and JDK classes that are re-used by the application source code. The unit tests may be executed with the use of a testing environment 175, and the results of the unit test execution can be provided in connection with logged data stored in test logging data 160.

The approaches discussed herein for unit testing can be contrasted from a variety of existing software products that provide some types of automated unit test generation. Examples of software that has some type of automatic or automated approaches to JAVA unit tests include TackleTest-Unit, Diffblue, and Squaretest. However, these tools are generic and are designed to create Unit Tests for any JAVA program. As a result of such generic approaches, unit test coverage that is produced for most code bases is low.

The approaches herein generate unit tests specifically for batch financial transaction processing, and introduce an approach to obtain much higher test coverage (e.g., 75-85%) than would be possible with conventional automated unit test tools. In particular, the following includes an approach to identify default values used by a JAVA code base to initialize classes and perform operations within methods. This results in an improved test coverage from automated unit test generation because unit tests will be customized to the expected use cases of classes, methods, and other constructed objects.

The techniques discussed herein are discussed with reference to the use of JAVA implementations of payments batch processing systems, but it will be understood that other types of financial and non-financial systems may also be enhanced. The following also refers to the generation of unit tests by processing a pre-existing code base (e.g., in an existing source code repository) with a large number of JAVA classes, but is also applicable to newly written code and ongoing development efforts. The following approaches may be applicable whether involving the use of POJOs (Plain Old JAVA Objects) or more advanced classes such as JAVA Beans (classes that encapsulate many objects into a single object).

FIG. 2 illustrates an example workflow for creating unit tests, such as with use of the automated unit test generator 155 and the testing environment 175. First, this workflow shows a first phase 210 for configuration of the testing environment 175. This may include operations to identify default values for primitives and JDK classes used by the application source code (operation 212).

Next, this workflow shows a second phase 220 for identifying the use of JAVA framework classes for unit testing. This may include operations to identify framework classes reused by application source code (operation 222) and generate mock classes for these framework classes that are used in application source code (operation 224).

Next, this workflow shows a third phase 230 for identifying the use of JAVA classes (unique to the program to be tested) for unit testing. This may include operations to identify classes of application source code to be tested (operation 232) and generate mock classes for each class to be tested (operation 234).

Finally, the workflow shows a fourth phase 240 for developing code for unit tests. This may include operations to create new unit tests for each class of the application source code under test (operation 242). These unit tests are developed to utilize the previously generated mock classes (generated in phases 220, 230) and the default values (generated in phase 210).

The following provides specific improvements to testing scenarios involving source code performing various aspects of payment or financial software data processing, including bill pay payments batch processing and direct pay payments batch processing. However, it will be understood that the present approaches may be applied to testing generated for other aspects of financial transaction processing, or to the generation of unit tests for features not directly involving financial transactions.

The automated unit test generation techniques discussed herein provide a specific advantage on the use of JAVA classes that are similarly repeated, especially for the use of the same JAVA classes that are instantiated repeatedly and predictably during batch processing. For example, consider a scenario where a financial transaction application is configured to process 1000 batches, and every batch invokes a handful of classes (e.g., based on one command, one batchlet, and two or three services). Each batch will invoke many web service calls (for example, over 200 web service calls) that uses some small number of classes (e.g., less than 10 JAVA classes). Although many methods and operations may be invoked in a code base to process a particular batch, each of the processing operations will be very similar to each other because every batch provides the same structured data. Accordingly, if a unit test is correctly generated for testing one web service based on specific starting values, then a unit test can be also correctly generated by using similar starting values to test other web services. Then if a unit test is applicable to the processing of one batch, it is applicable to the processing of the other 1000 batches.

Figure 3:
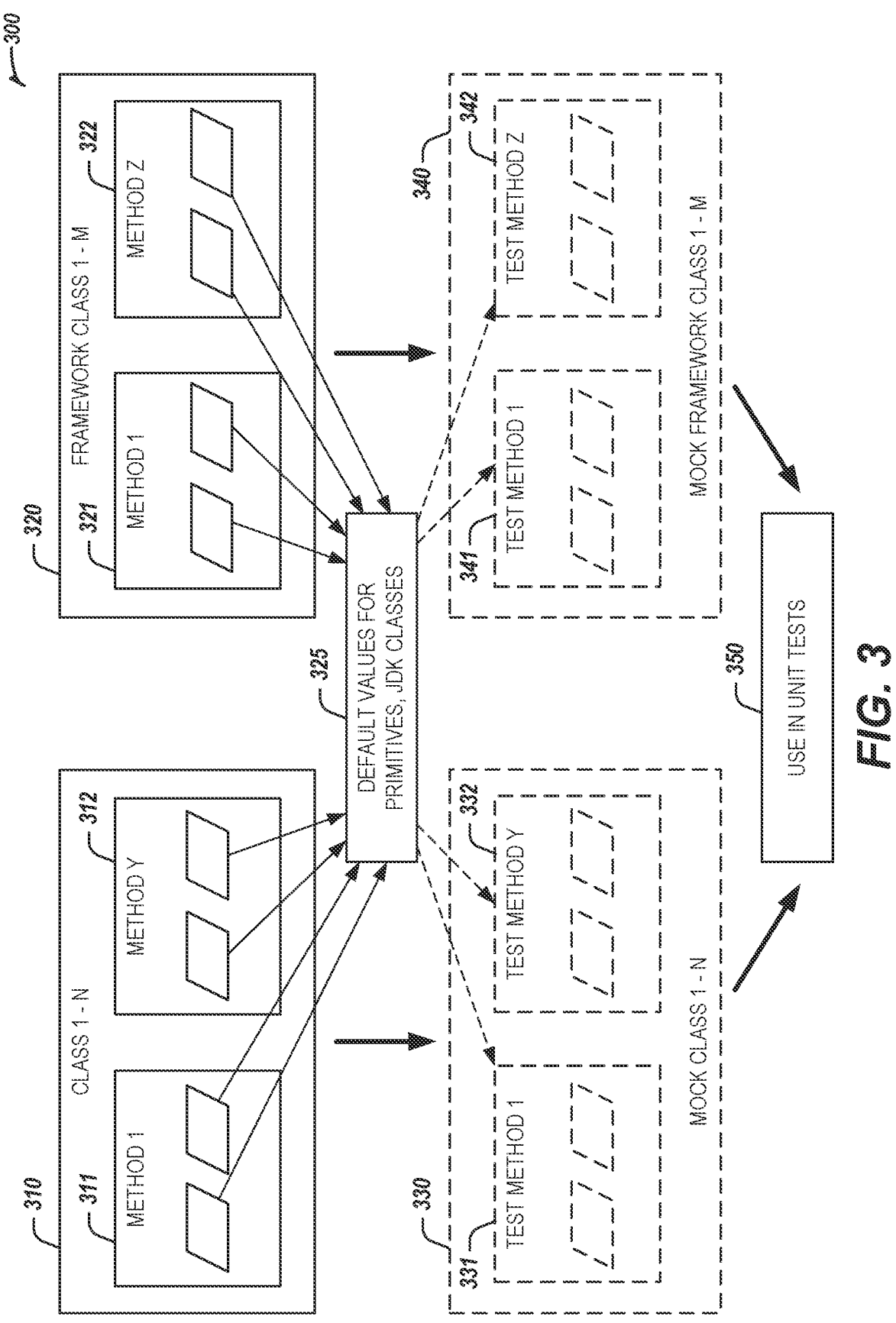
FIG. 3 illustrates relationships between classes, mock classes, and values used in connection with unit testing approaches, according to an example.

FIG. 3 illustrates example relationships between classes, mock classes, and values used in connection with unit testing approaches. This includes identifying repeating classes used in the code base, and preparing mock classes for these repeating classes. In the depicted scenario 300, software code is written to define newly created classes 310, with each newly created class including methods 1-Y 311, 312; and JAVA framework classes 320 (e.g., predefined or imported classes), with each framework class including methods 1-Z 321, 322.

The methods 1-N within each of the newly programmed classes 310 will include the use of multiple default data values, including the use of default values 325 for primitives and JDK classes (e.g., String, Integer, Array, HashMap). The methods 1-Z within each of the JAVA framework classes 320 will also include the use of multiple default data values for primitives and JDK classes.

As part of the process of generating unit tests, various mock classes are created to simulate the behavior of the respective classes. These mock classes may include mock classes 1-N 330 corresponding to newly created classes 310, and mock framework classes 1-M 340 corresponding to JAVA framework classes 320. The mock classes 1-N 330 may include test methods 1 331 to test method Y 332, and the mock framework classes 1-M 340 may include test method 1 341 to test method Z 342.

Then, during the development and use of the unit tests 350 (e.g., unit tests developed with JUnit), the mock classes 1-N 330 and 1-M 340 are invoked and use the default values 325. Additional logging and evaluation operations may be performed in the testing environment to determine whether all mock classes and methods of the mock classes have been invoked.

Figure 4:
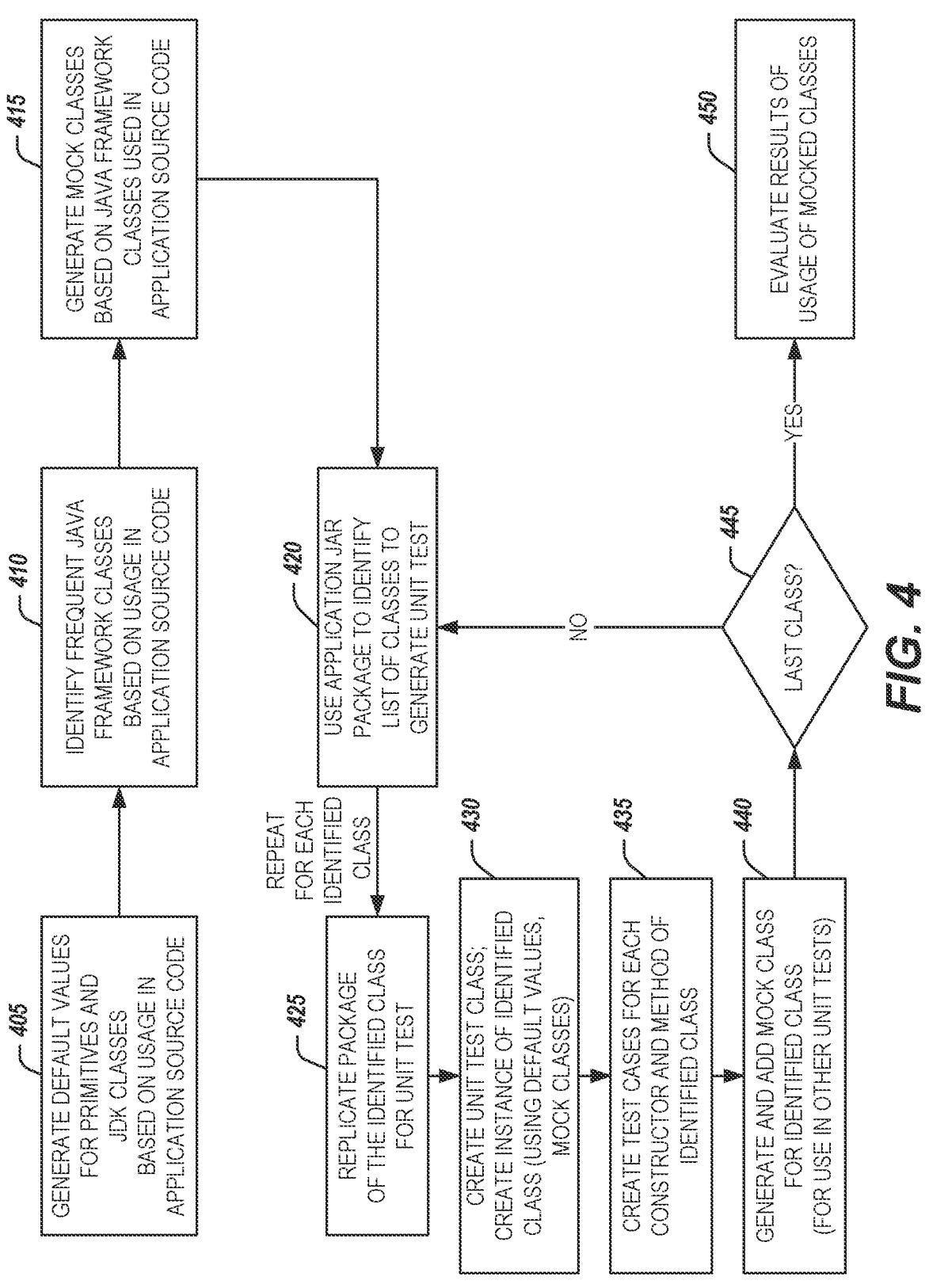
FIG. 4 is a flowchart of an iterative process for generating and tracking unit test coverage for respective classes, according to an example.

FIG. 4 illustrates a flowchart 400 of an iterative process for generating and tracking unit test coverage for respective classes. It will be understood that additional operations or substitute operations may be performed in connection with this process.

One of the preparation operations includes, at operation 405, to generate default values for primitives (e.g., int, short, char, etc.) and JDK classes (e.g., String, Integer, Array, HashMap) based on usage of the primitives and JDK classes in the application Source code.

Next, another preparation operation includes, at operation 410, to identify frequently invoked JAVA framework classes, based on usage in the application source code. This may include identifying the cornerstone JAVA classes that are reused by the application many times, such as batchlet, web service controller, and the like. Then, operation 415 includes to generate new mock classes based on the JAVA framework classes used in application source code. These preparation operations 410, 415 may correspond to the phase 220 depicted in FIG. 2. Additional preparation operations (not shown) may include setting the unit testing top-level (root) folder for the following operations.

Operation 420 includes the use of the application JAR package to identify a list of classes for which the unit testing will be generated. Then, operations 430, 435, and 440 are repeated for each class, until a determination 445 identifies a last class. These operations 430, 435, 440 may correspond to the phase 230 depicted in FIG. 2.

Operation 425 includes replicating package of the identified class for unit testing, such as by replicating the package in the unit test root folder. This may also include replicating path from the class's root folder so that the class and unit test will have same package name. This way, when the class and the unit test executed, the unit test will have direct access to every property, method, and inner class (except for a property, method, or inner class with private access modifiers). Private properties, methods, and inner classes are generated using reflection.

Operation 430 includes creating unit test class, via use of a unit testing framework. This unit test may involve creating an instance of the identified class, using prepared mocked classes as arguments if needed. This unit test may also involve using the default values generated at operation 405. The properties of the mocked classes are initialized either by direct access or by reflection. Then, operation 435 includes creating test cases for each constructor and method of the identified class instance. This may include calling methods of the identified class instance, either by calling a method/ constructor directly, or by using reflection. Operation 440 includes generating and adding mock classes for the identified class instance (e.g., inner public mock classes), to be used in other unit tests.

Thus, when entering the determination 445, the unit test for the identified class has been created, and additional inner public mocked class are also created. The operations 425, 430, 435, 440 are repeated for any remaining classes. An evaluation is performed at operation 450 to evaluate results of usage of mocked classes. For instance, during the unit test generation process, statistics may be being collected on the usage of mocked classes in a unit test. If the mock classes are missing, the missing mock classes may be implemented in usage-descending order.

FIG. 5 is a flowchart 500 of an example method for automated generation of JAVA unit tests, according to an embodiment. The method may provide features of any of the operations as described for FIGS. 1 to 4, or as otherwise discussed herein. This method may be implemented by a single entity or by multiple entities using software instructions, configured computer systems, or coordinating automated systems. Additionally, all or less than all of the depicted operations may be performed in connection with the following automated process.

Operation 505 includes identifying default values used in JAVA source code of a financial transaction software application. In one example, the financial software transaction application is programmed to perform batch processing of a plurality of financial transactions, but other actions and operations may be enabled or invoked by the programming. Also in an example, the default values used in the JAVA source code include respective values for primitives defined in the JAVA source code (e.g., to perform portions of the batch processing), and the default values also include respective values used for JAVA Development Kit (JDK) classes defined in the JAVA source code (e.g., to perform the batch processing).

Operation 510 includes identifying classes in the JAVA source code that are invoked to perform batch processing of multiple financial transactions. Specifically, classes are identified that are invoked by the financial transaction software application during the batch processing logic or operations. For instance, the identified classes invoked in the JAVA source code can include respective methods and constructors, and the unit tests developed by flowchart 500 are configured to invoke the respective methods and constructors.

Operation 515 includes generating mock classes for the classes that are invoked (in the JAVA source code) during the batch processing logic or operations. In a specific example, the identified classes invoked in the JAVA source code include JAVA framework classes, and generating the mock classes includes generating mock classes for the JAVA framework classes using a mocking framework. Also, in a specific example, the identified classes that are invoked are identified based on respective classes included in a JAVA Archive (JAR) package file.

Operation 520 includes creating unit tests to perform unit testing of the classes that are invoked (in the JAVA source code) during the batch processing logic or operations. These unit tests are configured to, among other actions, invoke the mock classes and use the default values for unit testing operations. In the example where a JAR package file is used, then creating the unit tests may include replicating contents of the package file for the respective classes (consistent with the use cases discussed in FIG. 4, above).

Operation 525 includes outputting the unit tests, such as providing digital output or data in a computer system, or to be saved or communicated to another computer system. Thus, the unit tests and related metadata may be provided for execution on the same computer, or to another computer.

Operation 530 includes executing the unit tests by the computer system. Execution of the unit test may be performed or facilitated with the use of a may include the use of a unit testing framework. In an example where respective classes to be tested are deployed in a JAR package file, the executing of the unit tests may include use of the replicated contents of the package file for the respective classes.

Operation 535, the results from the executing of the unit tests are provided in the computer system. This may include providing information relating to a usage of the generated mock classes by the executing of the unit tests, and information to determine code coverage of the automated unit testing generation.

Figure 6:
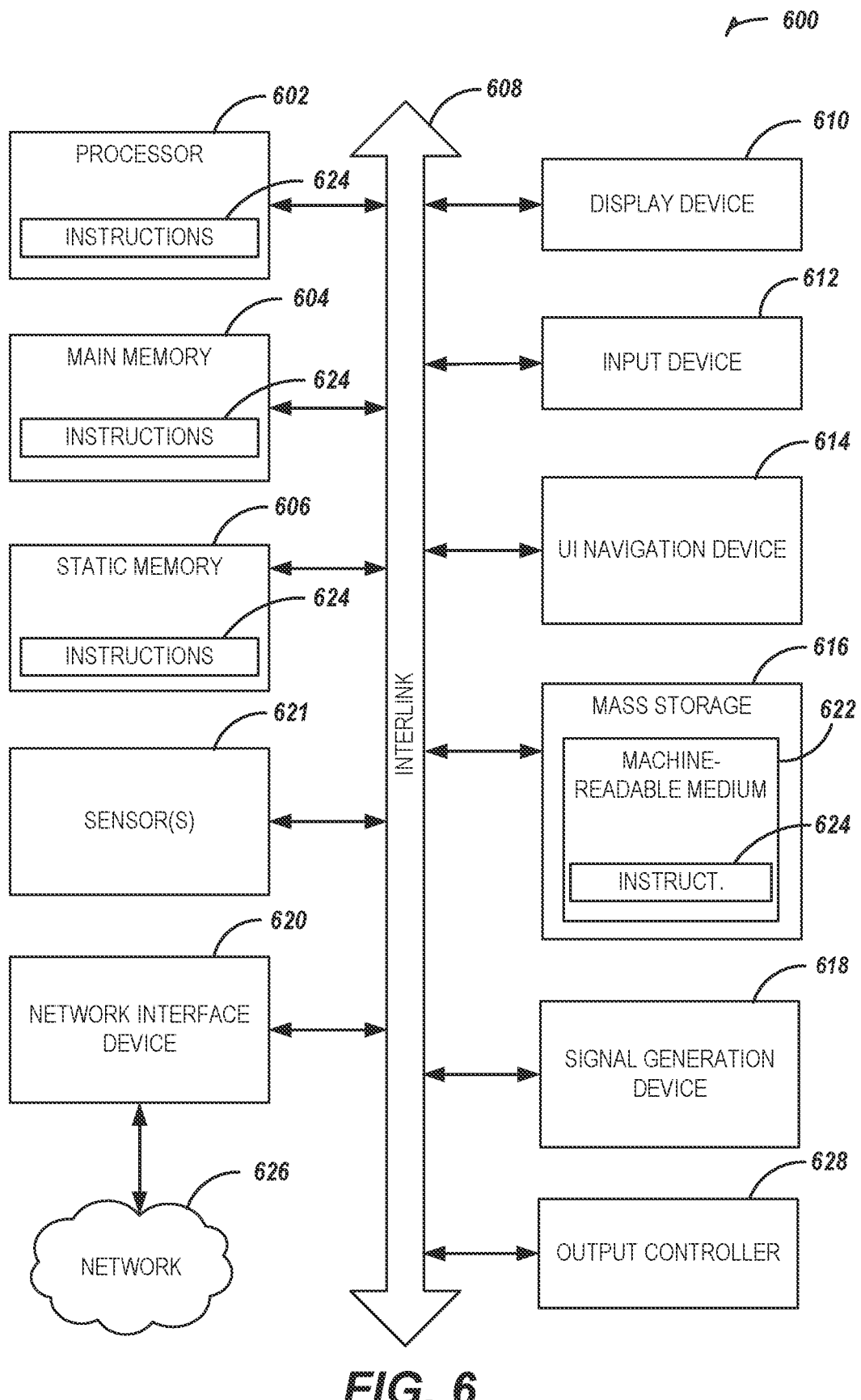
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a server, a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for automated generation of Java unit tests, performed with automated operations executed by at least one processor of a computer system, the method comprising:

identifying default values used in a code base of Java source code of a financial transaction software application by analyzing usage of primitives and Java Development Kit (JDK) classes in the Java source code, the financial transaction software application programmed to perform batch processing of a plurality of financial transactions;

identifying classes in the Java source code that are invoked by the financial transaction software application, the identified classes invoked during the batch processing of the plurality of financial transactions, wherein the default values provide (i) respective values for using the primitives and (ii) respective values for using the JDK classes, and wherein the default values initialize the primitives and the JDK classes defined in the Java source code across multiple methods of the identified classes, when the identified classes are invoked during the batch processing of the plurality of financial transactions;

generating mock classes for the identified classes that are invoked during the batch processing of the plurality of financial transactions;

creating unit tests to perform unit testing of the identified classes that are invoked during the batch processing of the plurality of financial transactions, the unit tests configured to invoke the mock classes and use the default values for unit testing of the identified classes; and outputting the unit tests in the computer system.

2. The method of claim 1, wherein the identified classes invoked in the Java source code include Java framework classes, and wherein generating the mock classes includes generating mock classes for the Java framework classes with use of one or more mocking framework classes.

3. The method of claim 1, wherein the identified classes invoked in the Java source code include respective methods and constructors, and wherein the unit tests are configured to invoke the respective methods and constructors.

4. The method of claim 1, further comprising:

causing the at least one processor to execute the unit tests and invoke one or more unit testing framework classes; and providing results in the computer system based on execution of the unit tests.

5. The method of claim 4, wherein the identified classes that are invoked are identified based on respective classes included in a Java Archive (JAR) package file;

wherein creating the unit tests includes replicating contents of the package file for the respective classes; and wherein the execution of the unit tests includes use of the replicated contents of the package file for the respective classes.

6. The method of claim 5, wherein providing the results based on the execution of the unit tests includes providing information relating to a usage of the generated mock classes by the execution of the unit tests.

7. A non-transitory machine-readable storage medium comprising instructions for automated generation of Java unit tests that, when executed by a processor of a computing system, cause the processor to perform operations to:

identify default values used in a code base of Java source code of a financial transaction software application by analyzing usage of primitives and Java Development Kit (JDK) classes in the Java source code, the financial transaction software application programmed to perform batch processing of a plurality of financial transactions;

identify classes in the Java source code that are invoked by the financial transaction software application, the identified classes invoked during the batch processing of the plurality of financial transactions, wherein the default values provide (i) respective values for using the primitives and (ii) respective values for using the JDK classes, and wherein the default values initialize the primitives and the JDK classes defined in the Java source code across multiple methods of the identified classes when the identified classes are invoked during the batch processing of the plurality of financial transactions;

generate mock classes for the identified classes that are invoked during the batch processing of the plurality of financial transactions;

create unit tests to perform unit testing of the identified classes that are invoked during the batch processing of the plurality of financial transactions, the unit tests configured to invoke the mock classes and use the default values for unit testing of the identified classes; and output the unit tests.

8. The non-transitory machine-readable storage medium of claim 7, wherein the identified classes invoked in the Java source code include Java framework classes, and wherein generating the mock classes includes generating mock classes for the Java framework classes with use of one or more mocking framework classes.

9. The non-transitory machine-readable storage medium of claim 7, wherein the identified classes invoked in the Java source code include respective methods and constructors, and wherein the unit tests are configured to invoke the respective methods and constructors.

10. The non-transitory machine-readable storage medium of claim 7, wherein the instructions further cause the processor to perform operations that:

cause the processor to execute the unit tests and invoke one or more unit testing framework classes; and provide results from execution of the unit tests.

11. The non-transitory machine-readable storage medium of claim 10, wherein the identified classes that are invoked are identified based on respective classes included in a Java Archive (JAR) package file;

wherein to create the unit tests includes replicating contents of the package file for the respective classes; and wherein the execution of the unit tests includes use of the replicated contents of the package file for the respective classes.

12. The non-transitory machine-readable storage medium of claim 11, wherein to provide the results from the execution of the unit tests includes to provide information relating to a usage of the generated mock classes by the execution of the unit tests.

13. A computer system configured for automated generation of Java unit tests, the computer system comprising:

at least one processor; and memory comprising instructions that, when executed by the at least one processor, cause the at least one processor to perform operations to:

identify default values used in a code base of Java source code of a financial transaction software application by analyzing usage of primitives and Java Development Kit (JDK) classes in the Java source code, the financial transaction software application programmed to perform batch processing of a plurality of financial transactions;

identify classes in the Java source code that are invoked by the financial transaction software application, the identified classes invoked during the batch processing of the plurality of financial transactions, wherein the default values provide (i) respective values for using the primitives and (ii) respective values for using the JDK classes, and wherein the default values initialize the primitives and the JDK classes defined in the Java source code across multiple methods of the identified classes when the identified classes are invoked during the batch processing of the plurality of financial transactions;

generate mock classes for the identified classes that are invoked during the batch processing of the plurality of financial transactions;

create unit tests to perform unit testing of the identified classes that are invoked during the batch processing of the plurality of financial transactions, the unit tests configured to invoke the mock classes and use the default values for unit testing of the identified classes; and output the unit tests.

14. The system of claim 13, wherein the identified classes invoked in the Java source code include Java framework classes, and wherein generating the mock classes includes generating mock classes for the Java framework classes with use of one or more mocking framework classes.

15. The system of claim 13, wherein the identified classes invoked in the Java source code include respective methods and constructors, and wherein the unit tests are configured to invoke the respective methods and constructors.

16. The system of claim 13, the memory further comprising instructions that, when executed by the at least one processor, cause the at least one processor to perform operations to:

cause the at least one processor to execute the unit tests and invoke one or more unit testing framework classes; and provide results based on execution of the unit tests.

17. The system of claim 16, wherein the identified classes that are invoked are identified based on respective classes included in a Java Archive (JAR) package file;

wherein to create the unit tests includes replicating contents of the package file for the respective classes;

wherein the execution of the unit tests includes use of the replicated contents of the package file for the respective classes; and wherein to provide the results from the execution of the unit tests includes to provide information relating to a usage of the generated mock classes by the execution of the unit tests.

\*   \*   \*   \*   \*